United States Patent [19]

Nara

[11] Patent Number: 4,754,333

[45] Date of Patent: Jun. 28, 1988

[54] ELECTRONIC STILL CAMERA PROVIDED WITH AN ELECTRICAL VIEWING SYSTEM

[75] Inventor: Yoshio Nara, Tokyo, Japan

[73] Assignee: Nippon Kogaku K.K., Tokyo, Japan

[21] Appl. No.: 810,315

[22] Filed: Dec. 17, 1985

[30] Foreign Application Priority Data

Dec. 18, 1984 [JP] Japan ................. 59-265214

[51] Int. Cl.⁴ .......................................... H04N 3/15
[52] U.S. Cl. ................. 358/213.19; 358/909
[58] Field of Search .......... 358/335, 906, 213, 19, 358/909, 228; 360/33.1, 35.1; 250/578

[56] References Cited

U.S. PATENT DOCUMENTS

| | | | |
|---|---|---|---|
| 4,131,919 | 12/1978 | Lloyd et al. | 358/906 |
| 4,204,755 | 5/1980 | Toyoda et al. | 354/36 |
| 4,262,301 | 4/1981 | Erlichman | 358/906 |
| 4,366,501 | 12/1982 | Tsunekawa et al. | 358/906 |
| 4,396,950 | 8/1983 | Roth | 358/213.19 |
| 4,420,773 | 12/1983 | Toyoda et al. | 358/335 |
| 4,456,931 | 6/1984 | Toyoda et al. | 358/335 |
| 4,541,016 | 9/1985 | Ochi et al. | 358/906 |
| 4,544,848 | 10/1985 | Kawasaki et al. | 358/213.19 |
| 4,553,170 | 11/1985 | Aoki et al. | 358/906 |
| 4,635,126 | 1/1987 | Kinoshita | 358/228 |

Primary Examiner—Donald McElheny, Jr.
Attorney, Agent, or Firm—Michael N. Meller

[57] ABSTRACT

An electronic still camera provided with an electronic view finder displaying an image corresponding to the image signal obtained from the solid imaging device under the selected exposure condition. The electronic view finder is adapted to display an image corresponding to the image signals obtained at the solid imaging device under the selected exposure conditions before the image signal is recorded by a recording device.

5 Claims, 5 Drawing Sheets

ELECTRONIC STILL CAMERA PROVIDED WITH AN ELECTRICAL VIEWING SYSTEM

BACKGROUND OF THE INVENTION

This invention relates to an electronic still camera provided with an electronic view finder or the like electrical viewing system adapted to display an image that is shot under preset exposure conditions.

The view finder of the electronic still camera adapted to record the object image in an electrical or magnetic memory in place of on silver halide film can be classified in two catagories, one being an optical view finder attached to the camera making use of silver halide film and the other being an electronic view finder designed to project the object image on a small-sized CRT or liquid crystal display attached to a video camera adapted for photo-electrically converting the object image into corresponding electrical signals.

This electronic view finder is widely used in a video camera because of its properties of projecting the object image obtained by photo-electric conversion. In a video camera making use of the image pickup tube or solid-state imaging device, one scene or frame is completed is about 1/30 second. The video signals are supplied to the image recording part and to an electronic view finder. Therefore, the electronic view finder of the video camera is capable of projecting the image before the video signals are recorded on the video tape by the image recording unit or projecting the image at the same time that the image is recorded on the video tape.

The electronic still camera is different from the video camera in that only one-frame or one-field video signals are recorded by the electronic still camera.

Hence, the electronic view finder of the television camera cannot be directly adapted under the same operating conditions to the electronic view finder of the electronic still camera, unless a memory as disclosed in U.S. Pat. No. 4,456,931 is used.

SUMMARY OF THE INVENTION

It is a principal object of the present invention to provide an electronic still camera having an electronic view finder adapted to display an image corresponding to image signals obtained from the solid-state imaging device under the selected exposure conditions.

The present invention resides in an electronic still camera comprising an optical system forming an object image and a solid-state imaging device outputting image signals corresponding to the object image formed by said optical means, wherein the image signals obtained upon driving the solid imaging device under the selected exposure conditions are directly displayed, whereby the image observed through the view finder may be of substantially the same quality as the image represented by the video signals recorded on the recording medium, such as the magnetic disk.

DESCRIPTION OF THE PREFERRED EMBODIMENTS

Figure 1:
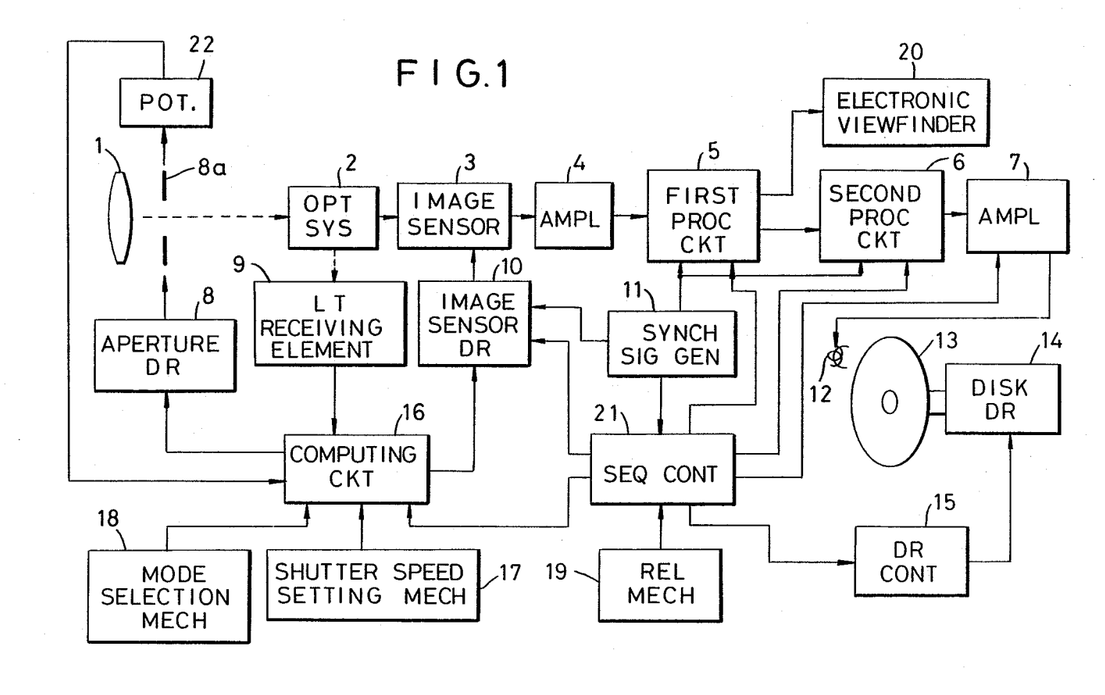
FIG. 1 is a block diagram of the electrical circuit of the electronic still camera equipped with an electronic view finder according to the present invention.

The electronic still camera shown in FIG. 1 is designed to select one of a plurality of shooting modes, that is, a light stop priority AE for controlling the exposure interval in accordance with the design light stop value to obtain an optimum exposure, a shutter speed priority AE for controlling the light stop in accordance with the design exposure interval to obtain an optimum exposure, program AE for controlling the light stop and exposure time in accordance with the brightness of the object to obtain an optimum exposure, and a manual mode for manually setting the stop value and exposure time, for setting the exposure conditions, to record on a recording medium such as small-sized magnetic disk the object image shot under the designed exposure conditions.

DESCRIPTION OF THE PREFERRED EMBODIMENT

The electronic still camera shown in FIG. 1 is designed so that, for pre-set exposure conditions, one of a plurality of shooting modes, that is, an aperture priority AE for controlling the exposure interval in accordance with the design aperture, a shutter speed priority AE for controlling the aperture in accordance with the design exposure interval, a program AE for controlling both the aperture and exposure interval in accordance with object brightness, and a manual mode for manually setting the aperture and exposure time, is selected, and the object image shot under the so-set exposure conditions is recorded on the recording medium, such as small-sized magnetic disk, while the same image as the recorded object image is projected on the electronic view finder.

Reference is made to FIG. 1, wherein an aperture 8a of a lens 1 is manually or automatically controlled to an aperture value 8a by an aperture driver 8.

The light from the object is irradiated on an image sensor 3 (solid state imaging device) and a light receiving element 9 through lens 1 and an optical system 2. The optical system is comprised of a half prism, half mirror or a beam splitter and designed to divide the light from lens 1 into two portions, that is, a major portion of which is conducted to the image sensor 3 and a major portion of which is conducted to the light receiving element 9. The image sensor 3 is comprised of an interline type CCD endowed per se with a shutter function, that is a function to control the exposure interval as desired so that, responsive to the driving control from an image sensor driving circuit 10, it outputs image or video signals obtained by the photo-electrical conversion of the object light. The video signals from the sensor 3 corresponding to the object image are applied via preamplifier 4 to a first processing circuit 5. It is noted that a frame transfer type CCD capable of acting as a shutter can be used in place of the interline transfer type CCD. When using a photo-electric conversion element which is incapable of acting as a shutter, i.e. lacks the shutter function, the light receiving section of the element may be provided with a shutter adapted for performing a high-speed repetitive operation through the use of the photo-electrical effect for providing the operation similar to that of the image sensor having the shutter function.

The first processing circuit 5 is designed to process the video input signals in a predetermined manner to output NTSC signals (signals combined from brightness, chrominance, horizontal sync and vertical sync signals), brightness signals and chrominance signals to supply the NTSC signals to an electronic view finder 20 comprised of a small-sized CRT while supplying the brightness and chrominance signals to a second processing circuit 6. The view finder 20 displays on CRT the object image represented by the NTSC input signals. The second processing circuit 6 is operative to frequency modulate the video signals made up of the brightness and chrominance input signals, to emphasize certain frequency components of the frequency-modulated video signals (pre-emphasis) to transmit the output signals through amplifier 7. Responsive to the output of the so-treated video signals, the magnetic disk 13 is driven in rotation at a predetermined speed in a controlled manner by the disk driver 14 and the drive controlling circuit 15 to record the video signals by means of the magnetic head 12.

The light receiving element 9, irradiated by a portion of the object light through the optical system 2, outputs to the computing circuit 16 the signals obtained by photo-electrical conversion of the irradiated light as brightness signals. The mode selection mechanism 18 is formed e.g. by a dial that may be manipulated by the operator to output to the computing circuit signals indicating one of the shooting modes consisting of aperture priority AE, shutter priority AE, program and manual modes. The potentiometer 22 outputs to the computing circuit 16 signals indicating the selected stop or aperture value. The computing circuit 16 computes the exposure conditions from the brightness input signals, selected aperture value and the selected shooting mode to output the aperture signals indicating the computed optimum aperture and the shutter speed signals indicating the optimum shutter speed (exposure interval) and transmit the aperture signal to the aperture driving unit 8, while transmitting the shutter speed signals to the image sensor driving circuit 10. It will be noted that, in case of manual setting of the stop value, the stop or aperture 8a is driven as commanded by the operator and, in case of manually setting the shutter speed by the speed setting mechanism 17, the shutter speed signals thus set are applied to the image sensor driving circuit 10 through the changeover switch 18.

The release mechanism 19 corresponds to a release button in a photographic camera using halide films and operates to transmit release signals to the sequence controlling circuit 21 responsive to the manual operation. The circuit 21 is designed to control the operation of the associated elements and operates to output control signals to the image sensor driver 10, first and second processing circuits 5 and 6, amplifier 7, driving control circuit 15 and the computing circuit 16 in proper timing for controlling these circuits. The synchronizing or sync signal generator 11 transmits sync timing signals to the image sensor driving circuit 10, first processing circuit 5, second processing circuit 6 and the sequence controlling circuit 21 to synchronize these circuit components. The computing circuit 16 performs a computing in accordance with the prior-art technique as shown, for example, in the U.S. Pat. No. 4,204,755. The shutter speed signals supplied from the computing circuit 16 to the image sensor driver 10 are digital signals.

The operation of the image sensor driver 10 and the image sensor 3 in the case of the selection of the aperture priority AE as the shooting mode will now be explained. When the aperture 8a of the lens 1 is set manually, the circuit 16 computes the shutter speed corresponding to the optimum light volume in response to the manual setting of the aperture for transmitting to the image sensor driver 10 shutter speed signals corresponding to the computed shutter speed. On the basis of the shutter speed input signals, the image sensor driver 10 outputs the driving control signals to the image sensor 3.

The interline transfer type CCD of the image sensor 3 performs an interlacing driving operation at the computed shutter speed to effect signal charge storage in the light receiving sections associated with a field A and the light receiving sections associated with a field B as a function of the light volume received from the object. The field A corresponds to an odd-numbered field and the field B to an even-numbered field so that one frame is made up by the fields A and B.

With the computed shutter speed equal to 1/30 second, signal charges are stored in the light receiving sections associated with the fields A and B. With the computed shutter speed faster than 1/45 second, an overflow drain for draining unused signal charges and an overflow control gate for variably controlling the shutter speed, hereinafter abbreviated to OFCG, are used. That is, the OFCG is set to a high level (H level) for a time interval equal to the 1/30-second shutter speed less the computed shutter speed to produce the state similar to that of shutter closure. In other words, during the H level state of the OFCG, storage of the signal charges in the light receiving section is inhibited so that storage of the signal charges may occur only during the period of the computed shutter speed.

With the shutter speed lower than 1/30 second, signal charges are stored during the period corresponding to the computed shutter speed.

Figure 2:
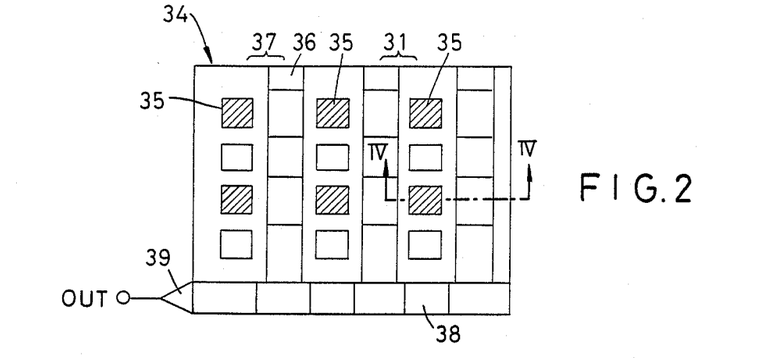
FIG. 2 shows the structure of the image sensor only diagrammatically.

The interline type image sensor 3 is designed and constructed as shown in FIG. 2 and is comprised of light receiving sections 35 designed to convert the light into signal charges to be stored, a transfer gate (TG) 37 designed to control the transfer of the signal charges from the light receiving sections 35 to a vertical transfer CCD 36, and a horizontal transfer CCD 38 designed to transfer the signal charges from CCD 36 to a floating diffusion amplifier 39, which outputs the signal charges from the CCD 36 after conversion thereof into predetermined voltage signals. In the drawing, the hatched and unhatched sections 35 correspond to the fields A and B, respectively.

In the drawing, an overflow drain 31 or OFD for draining excess charges produced in the sections 35 and an overflow control gate or OFCG, which will be clarified as the present description proceeds, are provided on a region adjacent to the sections 35.

The operation of the light receiving section 35, TG 37, vertical transfer CCD 36, OFD 31 and the OFCG in the image sensor 3 will be explained.

Figure 3A:
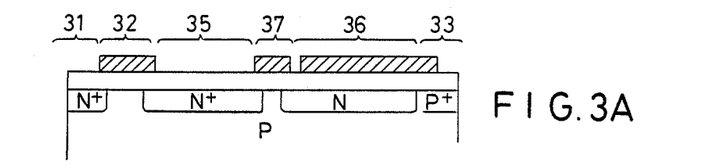
FIGS. 3A to 3D show the operation of the image sensor.

In FIG. 3A, which is a sectional view along line IV—IV in FIG. 2, there is illustrated an integrated structure on a P-type substrate comprised of the OFD 31, the OFCG 32, the light receiving sections 35, the TG 37, the vertical transfer CCD 36 and a channel stopper 33.

Figure 3B:
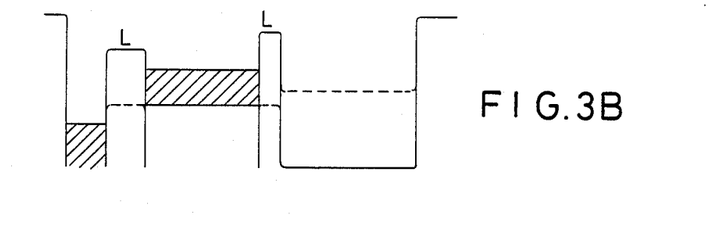
Figure 3C:
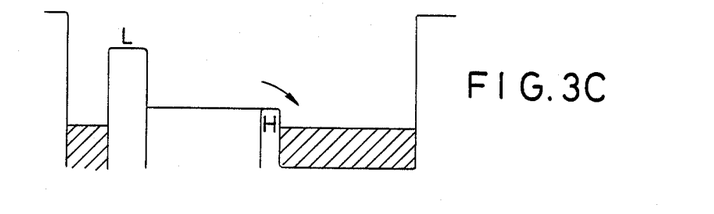
Figure 3D:
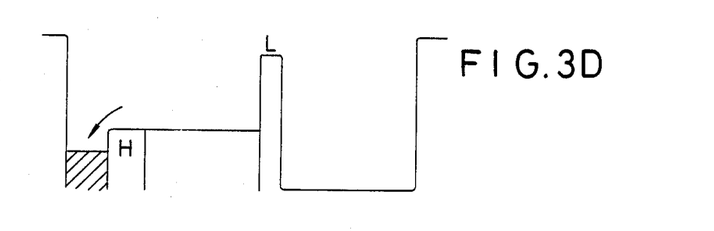

FIGS. 3B to 3D show the potential states of the respective parts wherein FIG. 3B shows the state of signal charge storage in the light receiving sections 35. It will be seen that both the OFCG 32 and TG 37 are at the low level, signal charges are stored in the light receiving sections 35 as indicated by the hatched lines and any excess charges evolved are inhibited by the TG 37, then at the low level, from flowing into CCD 36 but are drained to the OFD 31 via OFCG 32, which is similarly at the low level.

FIG. 3C shows the potential state and the flow of the signal charges when the TG37 is set to the H level from the state of FIG. 3B. With the TG 37 set to the H level, any signal charges stored in the light receiving sections 35 are transferred to the vertical CCD 36. Thus, by resetting the TG 37 to the L level from the state of signal transfer to the vertical transfer CCD 36 of FIG. 3C, and actuating the vertical transfer CCD 36 and the horizontal transfer CCD 38 shown in FIG. 2, voltage signals corresponding to the signal charges can be read-out at the floating diffusion amplifier 39.

FIG. 3D shows the potential state and the flow of signal charges when the OFCG 32 is set from the FIG. 3B state to the H level state. At this time, the signal charges stored in the light receiving sections 35 are drained to the OFD so that no signal charges are present in these sections 35.

Figure 4:
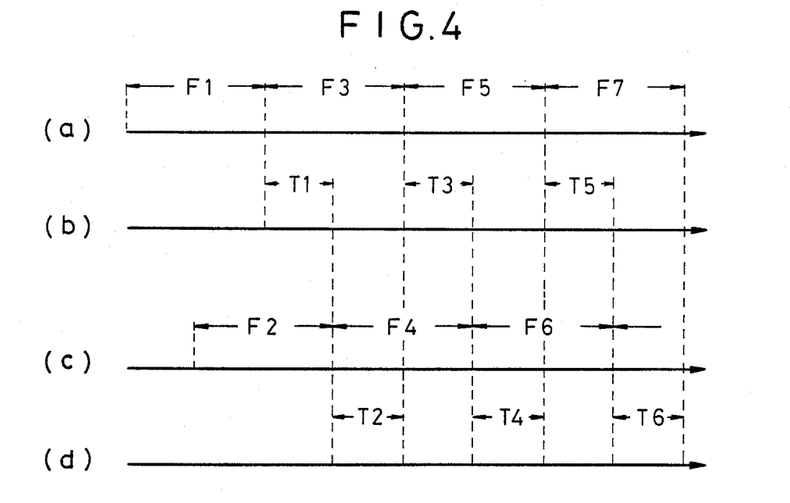
FIG. 4 is a timing chart showing the operation of the image sensor.

FIG. 4 shows the operation for the computed shutter speed equal to 1/30 second. FIG. 4(a) shows the storage time intervals F1, F3, F5 and F7 of the light receiving sections associated with the field A. FIG. 4(b) shows the read-out time intervals T1, T3 and T5 during which the charges stored in the sections associated with the field A are read out. FIG. 4(c) shows the storage time intervals F2, F4 and F6 of the light receiving sections associated with the field B. FIG. 4(d) shows the time intervals T2, T4 and T6 during which the charges stored in the sections associated with the field B are read out. The duration of the time intervals F1 to F7 is 1/30 second, whereas that of the time intervals T1 to T6 is 1/60 second.

As shown in FIGS. 4(a) and (b), signal charges are stored in the sections of the field A during the time indicated by F1. When the TG is at the H level, the charges stored in the light receiving sections associated with the field A are transferred to the vertical transfer CCD. During the time T1, the charges transferred to the vertical transfer CCD are read out. This sequence of operations is then repeated. As shown in FIGS. 4(c) and (d), signal charges are stored in the sections associated with the field B during the time indicated by F2. When the TG goes to the H level, the charges stored in the light receiving sections associated with the field B are transferred to the vertical transfer CCD and, during the time T2, the charges thus transferred to the vertical transfer CCD are read out. This sequence of operations is then repeated. With the shutter speed equal to 1/30 second, as shown in FIG. 4, the OFCG is held at the L level.

Figure 5:
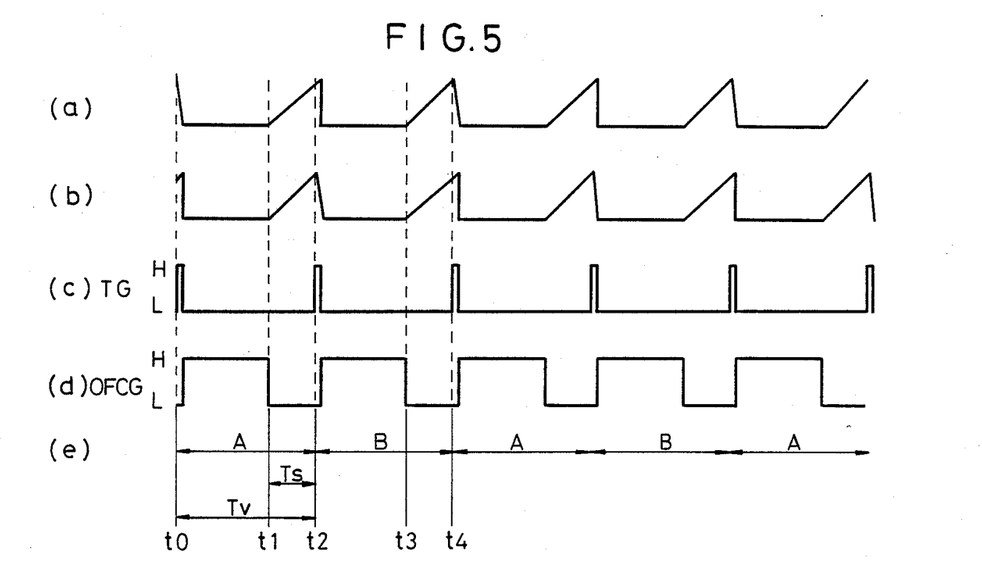
FIGS. 5 and 6 are timing charts showing the image sensor operation different from that shown in FIG. 4.

FIG. 5 is a timing chart showing the operation of the interline transfer type CCD (image sensor 3) in the case where the computed shutter speed is faster than 1/30 second. FIGS. 5(a) and (b) show signal charges stored in the light receiving sections, FIGS. 5(c) and (d) show the TG and OFCG operations, and FIG. 5(e) shows the display field indicated in the electronic view finder 20.

At time $t_o$, the TG goes to the H level. Then, the OFCG goes to the H level. With the TG at the H level, signal charges stored in the light receiving sections associated with the field A up to time $t_o$ are transferred to the vertical transfer CCD (register), whereas those stored in the sections associated with the field B are drained at the overflow drain. During the $t_o$-$t_i$ period equal to the shutter speed $T_v$ minus the computed shutter speed $T_s$, the OFCG is at the H level, which is equivalent to shutter closure.

Thus, signal charges are not stored in the light receiving sections. $T_v$ indicates the 1/60-shutter speed.

During the $t_1$-$t_2$ period, equal to the computed shutter speed $T_s$, signal charges are stored in the light receiving sections. The signal charges stored in the light receiving sections associated with the field A and transferred at time $t_o$ to the vertical transfer CCD are outputted as image or video signals to the view finder 20 through preamplifier 4 and first processing circuit 5, in such a manner that the image corresponding to the signal charges stored in the light receiving sections of the field A, viz. the object image, is indicated in the view finder 20.

At time $t_2$, the TG goes to the HL level and then to a level when the OFCG goes to the H level. At this time, the charges stored during the $t_1$-$t_2$ period in the sections associated with the field B are transferred to the vertical transfer CCD, while those stored in the sections associated with the field A are drained at the overflow drain.

The OFCG is at the H level during the period from the time when the TG goes to the L level to the time $t_3$ and, during the time $t_3$-$t_4$, the OFCG goes to the L-level to permit the signal charges to be stored in the light receiving sections. The signal charges of the light receiving sections of the field B transferred to the vertical transfer CCD are outputted during the $t_2$ to $t_4$ period at the view finder 20 so that the image corresponding to the signal charges of the light receiving sections associated with the field B is displayed in the view finder 20.

By repetition of the above-described sequence of operations, the OFCG and TG are controlled so that signal charges will be stored at the computed shutter speed $T_S$ for alternately outputting signal charges stored in the light receiving sections associated with the fields A and B.

In this manner, the image sensor 3 in the form of the interline transfer type CCD operates to store signal charges corresponding to the object light at the shutter speed $T_s$ which is faster than the shutter speed $T_v$ so that, even in case the computed shutter speed is greater than the shutter speed $T_v$, the view finder 20 may display the image associated with the fields A and B, that is, the object image, with each frame being completed in 1/30 second.

Figure 6:
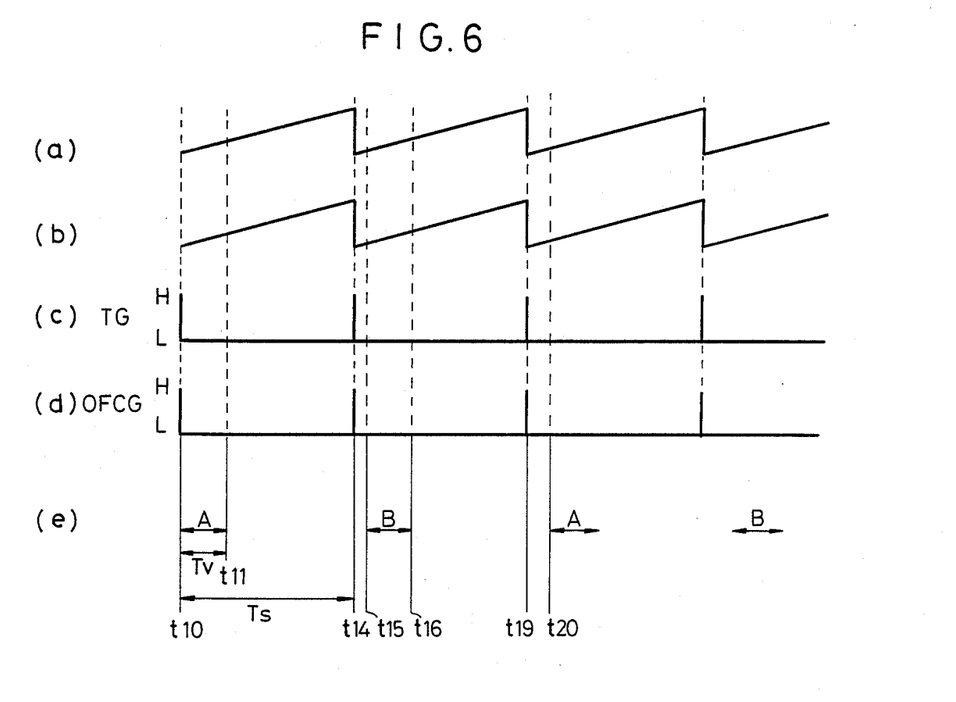

FIG. 6 is a timing chart showing the operation of the interline transfer type CCD in the case where the computed shutter speed is lower than 1/30 second, for example, equal to 1/15 second. FIGS. 6(a) and (b) show signal charges stored in the light receiving sections, FIGS. 6(c) and (d) show the operation of the TG and OFCG, and FIG. 6(e) shows the field displayed in the view finder 20.

At time $t_{10}$, the TG goes to a H level and then goes to a L level, the OFCG going to the H level. As the TG goes to H level, signal charges stored in the light receiving sections associated with the field A up to time $t_{10}$ are transferred to the vertical transfer CCD, whereas those stored in the light receiving sections associated with the field B are drained at the overflow drain. As the OFCG goes to the H level, the signal charges on the light receiving sections are completely removed.

Then, during the $t_{10}$ to $t_{14}$ period, that is, during the computed shutter speed $T_s$, the light receiving sections are exposed to store the signal charges in the light receiving sections. The signal charges of the light receiving sections of the field A transferred to the vertical transfer CCD are outputted during the time $t_{10}$-$t_{11}$ at the electronic view finder 20, where the image corresponding to the signal charges of the light receiving sections associated with the field A is displayed.

At time $t_{14}$, the TG goes to the H level and then to L level, the OFCG then going to H level. The signal charges stored during the $t_{10}$-$t_{14}$ period in the light receiving sections associated with the field B are transferred to the vertical transfer CCD while the signal charges of the light receiving sections associated with the field A are drained to the overflow drain so that the signal charges of the light receiving sections are completely removed.

Then, during the $t_{15}$-$t_{19}$ period, signal charges are stored in the light receiving sections. During the $t_{15}$-$t_{16}$ period, signal charges of the light receiving sections associated with field B and previously transferred to the vertical transfer CCD are outputted at the view finder 20 so that the image corresponding to the signal charges of the field B is displayed in the view finder.

In a similar manner, the shutter is switched at the computed shutter speed $T_s$ to permit the signal charge storage so that the signal charges stored in the sections associated with the fields A and B may be outputted alternately.

During the $t_{11}$-$t_{15}$ and $t_{15}$-$t_{20}$ periods, neither the signal charges of the field A nor the signal charges of the field B are outputted so that the image displayed in the view finder 20 corresponds to the signal charges of fifteen fields per second, thus inevitably resulting in image flickering. However, in such a case, the displayed image can be confirmed sufficiently.

Alternatively, field memory means may be provided for storage of signal charges in the light receiving sections associated with the field A or B, these signal charges being transmitted in the absence of the signal charges from the interline transfer CCD to prevent the occurrence of flickering.

Figure 7:
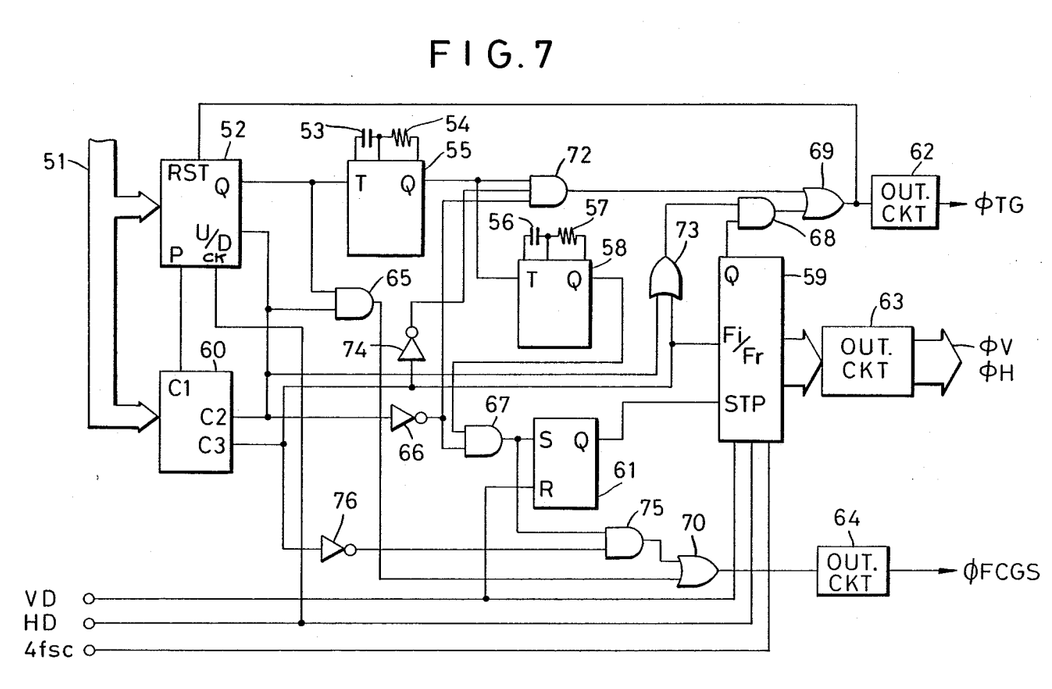
FIG. 7 is a circuit diagram of the circuit for driving the image sensor shown in FIG. 1.

FIG. 7 shows the image sensor driving circuit 10 (FIG. 1) adapted for driving the above-described interline transfer type CCD or image sensor 3. The circuit 10 is driven in operation by a shutter speed signal 51 transmitted from the light measuring computing circuit 16 (FIG. 1) or the shutter speed setting unit 17 (FIG. 1), vertical sync signals VD and horizontal sync signals HD transmitted from the sync signal generator 11 (FIG. 1), and a subcarrier $4f_{sc}$. The circuit 10 transmits, as driving control signals for the image sensor 3, vertical clock signals $\phi V$ and horizontal clock signals $\phi H$ driving the image sensor 3 at the television-rate shutter speed, transfer gate signals $\phi TG$ used for turning the TG on and off, and $\phi OFCG$ signals OFCGS used for turning the OFCG on and off.

In FIG. 7, the shutter speed discrimination circuit 60 is comprised of the shift register, comparator etc. and is used for discriminating whether the shutter speed indicated by the shutter speed input signal is faster or slower than 1/45 second. The terminal $C_2$ outputs a discrimination signal which goes high when $T_s \leq 1/60$ second and goes low when $T_s > 1/60$ second, this discrimination signal being transmitted to the U/D terminal of the counter 52. The signal is also transmitted as gating signals to AND gate 65 and OR gate 73, while being also inverted at an inverter 66 to be applied as gating signals to AND gates 67 and 72. The output terminal C1 outputs H level signals when $1/60 < T_s \leq 1/45$ and L level signals when $T_s \leq 1/60$ or $T_s < 1/45$. The terminal C3 outputs H level signals when $1/45 < T_s \leq 1/30$ and L level signals when $T_s > 1/30$.

The counter 52 is driven in operation with the horizontal sync signals HD applied to clock terminal CK being used as clock signals. When the H-level discrimination signals are transmitted from the shutter speed discrimination circuit 60 to terminal U/D, the counter 52 counts the time equal to the shutter speed or 1/60 second minus the input shutter speed. The counter also outputs a time count signal which goes to the H level during time counting and goes to the L level after termination of time counting, while also counting the time of the input shutter speed when the L-level discrimination signal is applied to terminal U/D.

Irrespective of the input signal in the U/D terminal, the counter 52 counts 1/60 second when the input signal at the P terminal is at the H level. The signal from the Q terminal of the counter 52 is introduced into an output circuit 64 through an OR gate 70 and an AND gate 65, to which is applied a gating signal that goes high when the input shutter speed is faster than 1/45 second. The signal is wave-shaped and level-converted in the output circuit 64 from which it is transmitted as the OFCG signal or $\phi OFCG$ to the image sensor 3. The time count signal is also transmitted to a trigger terminal T of a one-shot multivibrator 55.

The driving circuit 59 is driven in operation by vertical sync signals VD, horizontal sync signals HD and the subcarrier $4f_{sc}$ while transmitting as output signals clock signals $\phi V$, $\phi H$ via output circuit 63 and an output signal via output terminal Q, which signal goes high for a limited time interval during the blanking period of the vertical sync signals every 1/60 second. The driver 59 is comprised of a frequency divider consisting of a series connection of flip-flops, gating circuits connected to certain output terminals of plural flip-flops, and a sequence controlling circuit designed to control the switching of the gating circuit in dependence upon the signal level at the Fi/Fr terminal. The output signal from the output terminal Q of the driver 59 is introduced into the output circuit 62 through an OR gate 69 and an AND gate 68, to which is applied a signal going high when the input shutter speed is faster than 1/45 of a second. The signal is level-converted and wave-formed in the output circuit 62 so as to be applied as transfer gating signal $\phi TG$ to the image sensor 3. The output signal from the output terminal Q of the driver 59 is transmitted via OR gate 69 and AND gate 68 to the reset terminal RST of the counter 52 as reset signals. When the H-level signal is applied to the terminal STP, signal delivery from the driver 59 ceases. The terminal Fi/Fr is a changeover terminal between the first storage mode shown in FIG. 4 and the second storage mode shown in FIGS. 5 and 6. With the terminal Fi/Fr is at the H level, the vertical transfer CCD is driven in the first storage mode and, with the terminal Fi/Fr at the L level, the vertical transfer CCD is driven in the second storage mode and at a timing different from the first mode.

The one-shot multivibrator 55 is triggered by the falling edge of the time count signal transmitted from the counter 52 to the trigger terminal T, outputting a pulse signal at terminal Q which goes high during the time as set by the capacitor 53 and the resistance 54. The pulse signal from the multivibrator 55 is applied as transfer gate signal φTG to the image sensor 3 via an output circuit 62, an OR gate 69 and an AND gate 72, to which is applied a gating signal going high when the input shutter speed is lower than 1/30 second. The pulse signal is also supplied as the reset signal to the reset terminal RST of the counter 52 via AND gate 72 and OR gate 69, while being also applied to the trigger terminal T of the one-shot multivibrator 58.

The one-shot 58 is triggered by the falling edge of the trigger signal applied from the one-shot 55 to output a pulse signal at terminal Q that goes high only during the time as set by capacitor 56 and resistance 57. The pulse signal from multivibrator 58 is transmitted to the image sensor 3 as φOFCG via AND gate 67, to which is supplied the gating signal that goes high when the shutter speed is lower than 1/45 second, AND gate 75, OR gate 20, and output circuit 64. The pulse signal from multivibrator 58 is also transmitted as the set signal to terminal S of an RS flip-flop 61 via AND gate 67.

The pulse signal from one-shot 58 is applied as the set signal to the set terminal S of the RS flip-flop 61, to the reset terminal R of which is applied the vertical sync signal VD. When the set signal is applied to the flip-flop 61, a H-level signal is transmitted at output Q to the driver 59.

The operation of the image sensor shown in FIG. 7 is explained below by referring to the case wherein the input shutter speed is lower than 1/45 of a second.

When thereset signal is applied to the reset terminal RST, since the discrimination signal supplied to the U/D terminal is high, the counter 52 starts to count the time equal to the shutter speed of 1/60 second less the input shutter speed, where the counter 52 counts 1/60 second when $1/60 < T_s \leq 1/45$. During the time counting of the counter 52, the H-level time count signal is supplied at Q and transmitted to the image sensor 3 as φOFCG via AND gate 65, OR gate 70 and output circuit 64 so that signal charges are not stored in the image sensor 3 during the time count operation of the counter 52.

Upon termination of the time counting of the counter 52, the L-level time count signal is transmitted, so that charge storage is started in the image sensor 3. It will be noted that, upon termination of the time counting of the counter 52, one-shot 55 is triggered to output the pulse signals, however, since the L-level gating signals are supplied to the AND circuit 72, the transfer gate signal φTG remains at the L level.

Upon the lapse of 1/60 second, the driver 59 outputs a H-level signal at Q, which signal is applied as transfer gate signal φTG to the image sensor 3 via AND gate 68, OR gate 69 and output circuit 62, the TG of the image sensor 3 going high to transfer the signal charges to the vertical transfer CCD. After the transfer of the signal charges to the vertical transfer CCD, the driver 59 actuates the vertical transfer CCD. Since the signal is transmitted as reset signals to the counter 52, the above-described operation is performed repeatedly.

The operation for the case of the input shutter speed being lower than 1/30 second is now explained.

When the reset signal is supplied to the reset terminal RST, since the discrimination signal at the U/D terminal is at the L level, the counter 52 performs a time count operation of the input shutter speed $T_s$.

Then, upon termination of the time counting operation of the counter 52, one-shot 55 is triggered to output a pulse signal which is transmitted as transfer gate signal φTG to the image sensor 3 via AND gate 72, OR gate 69 and output circuit 62 so that the TG of the image sensor 3 goes high to effect the transfer of the signal charges to the vertical transfer CCD. Since the signal is supplied to the counter 52 as a reset signal, the counter 52 again counts the time of the input shutter speed $T_s$.

One-shot 58 is triggered by an output signal from one-shot 55 so that a pulse signal is outputted and transmitted to the image sensor 3 as φOFCG via AND gate 67, OR gate 70 and output circuit 64. Thus the OFCG of the image sensor 3 goes high for a short time to clear the signal charges of the fields A and B. This pulse signal is transmitted to the RS flip-flop 61 via AND gate 67 as a reset signal, in response to which RS flip-flop 61 outputs a H-level signal so that signal delivery by the driver 59 ceases. Thus, no H-level signals are outputted at the output terminal Q of the driver 59 after the lapse of 1/60 second, so that no transfer gate signal is transmitted to the image sensor 3. Since the driver 59 is reset by the next vertical sync signal VD, the driver 59 outputs clock signals φV and φH via output circuit 63 so that the signal charges transfered to the vertical transfer CCD are outputted as video or image signals in the view finder 20 to effect the display in the view finder 20 of the image corresponding to the signal charges. After the outputting of the signal charges, the driver 59 will resume its usual operation. However, the driver 59 is unable to output the transfer gate signal φTG even after the lapse of 1/60 second, since the L-level gating signal is now applied to the AND gate 68. Thus the image is not displayed in the view finder 20 until the counter 52 counts up and the one-shot 55 outputs the transfer gate signal φTG.

When the shutter speed $T_s$ is such that $1/45 < T_s \leq 1/30$, the driver 59 actuates the vertical transfer CCD as shown in FIG. 4 so that the OFCG signal is not transmitted to the image sensor 3 by the operation of the inverter 76 and the AND gate 75.

Although the stop priority AE has been described hereinabove as an example, it is to be noted that the image sensor 3 and the aperture 8a can be driven properly in dependence upon the occasional shutter speed setting even in the case of the shutter speed priority AE or program AE modes.

It is also to be noted that the video image may be recorded on the magnetic disk 13 upon the releasing of the shutter.

We claim:
1. An electrical still camera comprising:
 (a) optical means for forming an object image;
 (b) means for detecting the illumination of the object image and producing a brightness signal;
 (c) image pick-up means for producing picture signals each of which corresponds with the object image formed by said optical means,
  said image pick-up means including a solid state image pick-up device having a plurality of photoelectric conversion elements, producing means, transfer means and drain means,
  said plurality of photoelectric conversion elements comprising first and second groups, each of said plurality of photoelectric conversion elements storing charges corresponding to the intensity of incident light respectively impinging thereon, said transfer means transferring said stored charges of said plurality of photoelectric conversion elements to said producing means, said producing means producing said picture signals in response to said stored charges transferred by said transfer means, said drain means draining said stored charges to an outside of said solid state image pick-up device so that said stored charges are drained by said drain means irrespective of said picture signals;

(d) calculating means responsive to said brightness signal for calculating a stored time during which said plurality of photoelectric conversion elements store charges;

(e) driving means for controlling said transfer means and said drain means so that said producing means produces said picture signal conforming to said first group and said picture signal conforming to said second group at different times, said driving means having a first state, a second state and a third state and repeatedly performing an operation conforming to each of said three states;

(f) viewfinder means for visualizing each of said picture signals; and (g) selecting means responsive to said stored time calculated by said calculating means for selecting one of said states, wherein in said first state said driving means drives said transfer means and said drain means repeatedly in a cycle corresponding to said calculated stored time so that said drain means drains said stored charges to the outside of said solid state image pick-up device in response to completion of a transferring operation of said transfer means, in said second state said driving means drives said transfer means repeatedly in a cycle corresponding to a predetermined period of time and stops said drain means continuously, and in said third state said driving means drives said transfer means and said drain means repeatedly in a cycle corresponding to said predetermined period of time so that said drain means drains said stored changes to the outside of said solid state image pick-up device for a period of time, which corresponds to a difference between said predetermined period of time and said calculated stored time, in response to the completion of the transferring operation of said transfer means.

2. An electrical still camera according to claim 1, wherein said predetermined period of time is substantially equal to 1/60 second.

3. An electrical still camera according to claim 1, wherein said selecting means comprises discriminating means for discriminating said calculated stored time, said discriminating means producing a first discriminating signal when said calculated stored time is above a predetermined range which includes said predetermined period of time multiplied by two, a second discriminating signal when said calculated stored time is within said predetermined range, and a third discriminating signal when said calculated stored time is below said predetermined range, said selecting means selecting said first state in response to said first discriminating signal, said second state in response to said second discriminating signal, and said third state in response to said third discriminating signal.

4. An electrical still camera according to claim 3, wherein said predetermined range is constituted by periods which are not greater than said predetermined period of time multiplied by two.

5. An electrical still camera according to claim 4, wherein said predetermined period of time is substantially equal to 1/60 second.

* * * * *